United States Patent Office

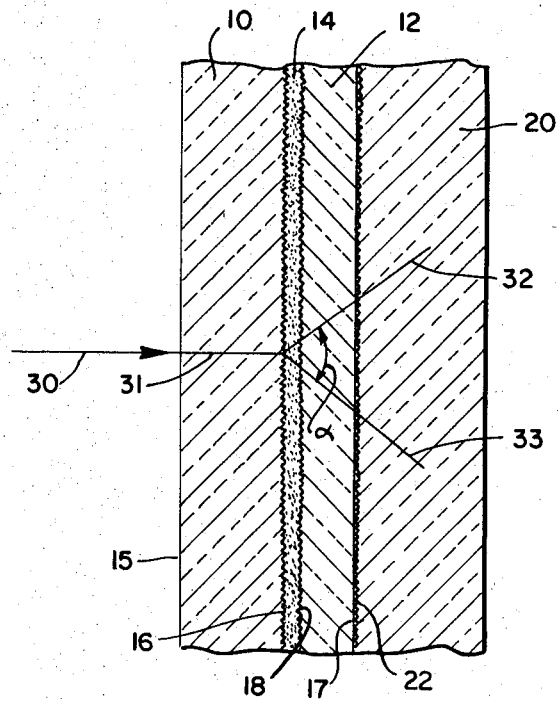

3,527,519
Patented Sept. 8, 1970

3,527,519
REAR PROJECTION SCREEN
Arnold Reitman, Deer Park, N.Y., assignor, by mesne assignments, to Microform Data Systems, Inc., a corporation of Delaware
Filed Dec. 18, 1967, Ser. No. 691,593
Int. Cl. G03b 21/56
U.S. Cl. 350—117          3 Claims

ABSTRACT OF THE DISCLOSURE

A rear projection viewing screen comprises a laminate consisting of two glass sheets having opposed satin ground surfaces which are bonded together by an adhesive medium having a refractive index which is less than that of the glass sheets. The laminate may be used by itself as a rear view projection screen or it may be placed directly behind and contiguous with a standard rear projection screen.

---

The present invention relates to rear projection screens of the type, for example, used with microfilm and microimage viewers.

A rear (or backlit) projection screen is used where an image is to be projected onto one side of the screen and viewed from the other side. Such screens are used in numerous different systems including microfilm or microimage viewers of the type shown, for example, in U.S. patent application Ser. No. 472,498 filed in the name of James W. Stroud on July 16, 1965 and assigned to the assignee of this application.

Since an image is projected as specular transmission, it is necessary for a rear projection screen to diffuse or scatter the projected light, so that the image can be more readily observed by the user. For this purpose, a standard rear projection screen comprises a plate of glass or plastic having one diffusion surface (for example, a satin ground surface). The diffusion surface causes the projected specular transmission to be diffused or scattered into numerous diverging light rays which, for well-known reasons, enables the image to be observed on the screen.

Commercially available rear projection screens cause these scattered light rays to diverge over a relatively wide angle which emphasizes undesirable optical defects such as chromatic aberration and spherical aberration. The latter defect produces non-uniform illumination or "hot spots" which possibly may give rise to the phenomenon of scintillation. These defects of standard rear projection screens are well known to those skilled in the art.

Accordingly, the main object of the present invention is to provide a rear projection screen wherein the aforementioned optical defects are substantially minimized.

Briefly, in accordance with the invention, the diffusion surface of a glass sheet is coated with a transparent material having a refractive index less than that of the glass. Preferably, the coating serves as an adhesive bonding material between the diffusion surfaces of two glass sheets and the entire laminate is mounted in a contiguous relationship behind a standard rear projection screen.

The drawing is a diagrammatic side view of a rear projection screen in accordance with the invention and illustrating the paths of typical light rays.

According to the invention, a laminate is formed by bonding together two optical quality glass sheets 10 and 12 by means of a transparent adhesive medium 14. Sheets 10 and 12 have respective polished surfaces 15 and 17 and opposing diffusion or matte surfaces 16 and 18 such as, for example, satin ground surfaces which are in intimate contact at all points with the transparent bonding medium 14 (i.e. there is no air space between the two). The laminate may then be physically secured in a contiguous relationship with the rear surface 22 of a standard rear projection screen 20, comprising, for example, a glass plate having a satin ground rear surface 22. The image, of course, is projected from the left of the screen (in FIG. 1) and the observer would be positioned to the right thereof.

Projection screens in accordance with the preferred embodiment of the invention illustrated in the drawing have been built and tested, and the improved results have been noted. It is believed that the following theoretical explanation is accurate, but it is possible that it may not be the reason (or it may be only one of a number of reasons) why a rear projection screen according to the invention retards the optical defects referred to above. Accordingly, the following explanation is offered only for the purpose of explaining the present belief as to why the invention is effective and should not be construed as limiting in any respect.

Consider a theoretical pencil or beam of light 30 corresponding to the specular transmission of a part of the projected image and impinging upon the rear surface 15 of the screen. When the beam 30 strikes the polished surface 15 of the first sheet 10, it continues through sheet 10 on the same path as shown at 31 since beam 30 is essentially normal to polished surface 15 and therefore is not refracted or scattered by it.

However, when the beam 31 strikes the interface between the sheet 10 and bonding medium 14, which is defined by the diffusion surface 16, the beam will be refracted or scattered into a number of divergent beams, the limits of which are represented by the beams 32 and 33 for purposes of explanation. Because the refractive index of the bonding medium 14 is less than that of the glass sheet 10, but higher than that of air (which equals approximately one), the diffusion angle $\alpha$ of the beams 32 and 33 is less than it would be if the beam 31 emerged from surface 16 into air. Thus, although beam 31 is diffused or scattered into the same "number" of individual light rays within the angle $\alpha$ between glass and air, the refraction of the scattered light rays (which defines angle $\alpha$) within the bonding medium 14 is reduced thereby reducing the maximum bending effect on these light rays caused by the difference in refractive indices at the interface of the two dissimilar media. The result is improved clarity or definition, reduction or avoidance of hot spots, and retardation or deemphasis of chromatic and spherical aberrations.

In the preferred embodiment, the diffused light rays from surface 16 (including rays 32 and 33) are further diffused by the satin ground surface 18 of the second glass sheet 12. This secondary diffusion of the already diffused light rays will further enhance the uniformity of illumination as observed by the user. Similarly, the standard rear projection screen 20 serves merely to further diffuse the light rays from the second sheet 12 and its use is not required to practice the invention.

In the preferred embodiment, each of the glass sheets 10 and 12 is made from a satin finish ground glass of the type manufactured by the Semon Bache & Company of New York, N.Y. Each of the sheets is approximately one-eighth inch thick and has an index of refraction ($n_D$) of 1.52 nominally. The material used for the bonding material 14 is a room temperature vulcanizing silicone rubber manufactured by the Silicon Products Department of General Electric in Waterford, N.Y., and sold under the trade designation RTV–602. This material is a low viscosity transparent compound that cures with the addition of a catalyst to form a completely transparent, resilient solid. The index of refraction of RTV–602 is equal to 1.406 and the thickness of the coating was approximately equal to .005 inch.

What is claimed is:

1. A rear projection screen comprising a first sheet of transparent material having a polished rear surface and a front diffusion surface for scattering light rays passing therethrough, a transparent coating in intimate contact with the diffusion surface, the index of refraction of the transparent coating being less than the index of refraction of said first sheet but greater than that of air, and a second sheet of transparent material in intimate contact with said coating, said coating being sandwiched between the two sheets, at least one of the surfaces of said second sheet comprising a diffusion surface for scattering light rays passing therethrough.

2. A rear projection screen according to claim 1, wherein the said diffusion surface of said second sheet is formed on the surface contacting said coating.

3. A rear projection screen according to claim 2, wherein said sheets are made of glass and said coating comprises a room temperature vulcanizing silicon rubber.

References Cited

UNITED STATES PATENTS 2,122,178  6/1938  Land.
2,268,351  12/1941  Tanaka _____ 350—128

NORTON ANSHER, Primary Examiner

M. H. HAYES, Assistant Examiner